US011293530B2

(12) United States Patent
Faria

(10) Patent No.: US 11,293,530 B2
(45) Date of Patent: Apr. 5, 2022

(54) CLAMPING DEVICE

(71) Applicant: SCHAEFFLER TECHNOLOGIES AG & CO. KG, Herzogenaurach (DE)

(72) Inventor: Christof Faria, Erlangen (DE)

(73) Assignee: Schaeffler Technologies AG & CO. KG, Herzogenaurach (DE)

( * ) Notice: Subject to any disclaimer, the term of this patent is extended or adjusted under 35 U.S.C. 154(b) by 355 days.

(21) Appl. No.: 16/345,605

(22) PCT Filed: Nov. 7, 2017

(86) PCT No.: PCT/DE2017/100938
§ 371 (c)(1),
(2) Date: Apr. 26, 2019

(87) PCT Pub. No.: WO2018/086656
PCT Pub. Date: May 17, 2018

(65) Prior Publication Data
US 2021/0285526 A1    Sep. 16, 2021

(30) Foreign Application Priority Data
Nov. 8, 2016    (DE) .......................... 102016221797.6

(51) Int. Cl.
*F16H 7/12*     (2006.01)
*F16B 2/02*     (2006.01)
*F16H 7/08*     (2006.01)

(52) U.S. Cl.
CPC ............. *F16H 7/1281* (2013.01); *F16B 2/02* (2013.01); *F16H 2007/081* (2013.01);
(Continued)

(58) Field of Classification Search
CPC ...... F16H 2007/0878; F16H 2007/0806; F16H 2007/0812; F16H 2007/081; F16H 2007/0893
(Continued)

(56) References Cited

U.S. PATENT DOCUMENTS 4,743,224 A * 5/1988 Yoshikawa ........... F16H 7/1281
474/101
4,832,665 A * 5/1989 Kadota ................. F16H 7/1227
474/112
(Continued)

FOREIGN PATENT DOCUMENTS

| DE | 102013002993 A1 | 8/2014 |
| EP | 1541896 A1 | 6/2005 |
| EP | 2154394 B1 | 10/2011 |

OTHER PUBLICATIONS

International Search Report for International Application No. PCT/DE2017/100938 dated Jan. 29, 2018.

*Primary Examiner* — Henry Y Liu
(74) *Attorney, Agent, or Firm* — Rutan & Tucker LLP; Hani Z. Sayed

(57) ABSTRACT

A first clamping part and a second clamping part, which are movable relative to one another and to a base. A spring fixed between the first and second clamping parts. The spring applies force to the first and second clamping parts in a direction of the reciprocal movement thereof. A first locking part detachably locks the first and second clamping parts to each other when the spring is tensioned. A second locking part detachably locks the second clamping part to the base. The locking parts intermesh by forming a joint with limited motion.

16 Claims, 8 Drawing Sheets

(52) U.S. Cl.
CPC ........... *F16H 2007/0846* (2013.01); *F16H 2007/0865* (2013.01); *F16H 2007/0874* (2013.01); *F16H 2007/0893* (2013.01)

(58) Field of Classification Search
USPC .................................. 474/111, 134, 135
See application file for complete search history.

(56) References Cited

U.S. PATENT DOCUMENTS

| | | | | |
|---|---|---|---|---|
| 4,923,435 | A * | 5/1990 | Kadota | F16H 7/1227 474/112 |
| 5,033,992 | A * | 7/1991 | Ojima | F16H 7/08 474/111 |
| 5,035,680 | A * | 7/1991 | Ojima | F16H 7/08 474/138 |
| 5,106,344 | A * | 4/1992 | Ojima | F16H 7/08 474/117 |
| 5,244,438 | A * | 9/1993 | Golovatai-Schmidt | F16H 7/1281 474/112 |
| 5,370,584 | A * | 12/1994 | Todd | F16H 7/08 474/110 |
| 5,628,701 | A * | 5/1997 | Dembosky | F16H 7/08 474/103 |
| 5,632,698 | A * | 5/1997 | Suzuki | F16H 7/0848 474/110 |
| 5,643,117 | A * | 7/1997 | Dembosky | F16H 7/0848 474/110 |
| 5,676,614 | A * | 10/1997 | Inoue | F16H 7/08 474/110 |
| 5,797,817 | A * | 8/1998 | Senftleben | F01L 1/02 474/110 |
| 5,911,641 | A * | 6/1999 | Sheren | F16H 7/0848 474/109 |
| 5,931,754 | A * | 8/1999 | Stief | F16H 7/0848 474/109 |
| 5,989,138 | A * | 11/1999 | Capucci | F16H 7/08 474/109 |
| 5,989,139 | A * | 11/1999 | Dusinberre, II | F16H 7/08 474/110 |
| 6,083,131 | A * | 7/2000 | Katogi | F16H 7/1236 474/110 |
| 6,238,311 | B1 * | 5/2001 | Cutting | F16H 7/08 474/109 |
| 6,244,981 | B1 * | 6/2001 | Simpson | F16H 7/0848 474/110 |
| 6,312,351 | B1 * | 11/2001 | Simpson | F16H 7/0848 474/109 |
| 6,375,588 | B1 * | 4/2002 | Frankowski | F16H 7/1227 474/101 |
| 6,447,416 | B1 * | 9/2002 | Jacques | F16H 7/08 474/111 |
| 6,602,154 | B1 * | 8/2003 | Guichard | F16H 7/08 474/101 |
| 6,659,896 | B1 * | 12/2003 | Stief | F16H 7/1281 474/112 |
| 2001/0009876 | A1 * | 7/2001 | Kurohata | F16H 7/0848 474/110 |
| 2001/0009877 | A1 * | 7/2001 | Kurohata | F16H 7/0848 474/110 |
| 2001/0039223 | A1 * | 11/2001 | Wakabayashi | F16H 7/08 474/111 |
| 2003/0017893 | A1 * | 1/2003 | Kaido | F16H 7/08 474/101 |
| 2003/0017894 | A1 * | 1/2003 | Kaiser | F16H 7/1218 474/112 |
| 2003/0109342 | A1 * | 6/2003 | Oliver | F02B 67/06 474/134 |
| 2003/0125142 | A1 * | 7/2003 | Hashimoto | F16H 7/24 474/109 |
| 2003/0216203 | A1 * | 11/2003 | Oliver | F16H 7/1281 474/134 |
| 2004/0007200 | A1 * | 1/2004 | Kurokawa | F16H 7/0848 123/198 R |
| 2004/0092348 | A1 * | 5/2004 | Hashimoto | F16H 7/0848 474/109 |
| 2004/0127316 | A1 * | 7/2004 | Hashimoto | F16H 7/0848 474/109 |
| 2004/0138018 | A1 * | 7/2004 | Hayakawa | F16H 7/0836 474/122 |
| 2004/0180745 | A1 * | 9/2004 | Dinca | F16H 7/24 474/135 |
| 2005/0049093 | A1 * | 3/2005 | Sato | F16H 7/0836 474/101 |
| 2005/0130776 | A1 * | 6/2005 | Markley | F16H 7/24 474/109 |
| 2006/0046882 | A1 * | 3/2006 | Assel | F16H 7/08 474/111 |
| 2006/0084537 | A1 * | 4/2006 | Matsushita | F16H 7/0836 474/109 |
| 2006/0094548 | A1 * | 5/2006 | Sato | F16H 7/0848 474/109 |
| 2007/0021251 | A1 * | 1/2007 | Redaelli | F16H 7/08 474/109 |
| 2008/0207367 | A1 * | 8/2008 | Bogner | F16H 7/1281 474/133 |
| 2008/0293527 | A1 * | 11/2008 | D'Amicantonio | F16H 7/1218 474/135 |
| 2009/0011881 | A1 * | 1/2009 | Lehtovaara | F16H 7/1281 474/135 |
| 2009/0111629 | A1 * | 4/2009 | Kobara | F02B 67/06 474/111 |
| 2009/0205206 | A1 * | 8/2009 | Markley | F16H 7/08 29/888.01 |
| 2009/0215563 | A1 * | 8/2009 | Sauermann | F16H 7/1281 474/135 |
| 2009/0215564 | A1 * | 8/2009 | Pflug | F16H 7/1281 474/135 |
| 2009/0286637 | A1 * | 11/2009 | Stief | F16H 7/1281 474/135 |
| 2010/0022340 | A1 * | 1/2010 | Schmidl | F16H 7/1281 474/135 |
| 2010/0035712 | A1 * | 2/2010 | Hartmann | F16H 7/1281 474/110 |
| 2010/0222167 | A1 * | 9/2010 | Chekansky | F16H 7/0836 474/110 |
| 2010/0273591 | A1 * | 10/2010 | Graf | F16H 7/08 474/138 |
| 2011/0015014 | A1 * | 1/2011 | Kroon | F16H 7/08 474/110 |
| 2011/0028253 | A1 * | 2/2011 | Perissinotto | F16H 7/0848 474/135 |
| 2011/0230288 | A1 * | 9/2011 | Schulz | F16H 7/0848 474/110 |
| 2012/0040790 | A1 * | 2/2012 | Perissinotto | F16H 7/0848 474/110 |
| 2013/0190117 | A1 * | 7/2013 | Bauer | F16H 7/08 474/111 |
| 2014/0179471 | A1 * | 6/2014 | Markley | F16H 7/0836 474/110 |
| 2015/0005120 | A1 * | 1/2015 | Kurematsu | F16H 7/08 474/111 |
| 2015/0011345 | A1 * | 1/2015 | Lescorail | F16H 7/1281 474/136 |
| 2015/0247558 | A1 * | 9/2015 | Hamers | F16H 7/1218 474/117 |
| 2015/0345596 | A1 * | 12/2015 | Lindner | F16H 7/0836 474/111 |
| 2015/0354674 | A1 * | 12/2015 | Markley | F16H 7/0848 474/110 |
| 2015/0369346 | A1 * | 12/2015 | Sisodia | F16H 7/14 474/135 |
| 2015/0369347 | A1 * | 12/2015 | Wolf | F16H 7/1281 474/134 |
| 2016/0252166 | A1 * | 9/2016 | Noro | F16H 7/08 474/111 |

(56) References Cited

U.S. PATENT DOCUMENTS

2016/0252167 A1* 9/2016 Guyot ................ F16H 7/08
　　　　　　　　　　　　　　　　　　474/111
2016/0273623 A1* 9/2016 Spicer ................ F16H 7/1245
2016/0348765 A1* 12/2016 Ishikawa ............ F16H 7/0836

* cited by examiner

CLAMPING DEVICE

CROSS-REFERENCE TO RELATED APPLICATIONS

This application is the U.S. National Phase of PCT/DE2017/100938 filed Nov. 7, 2017, which claims priority to DE 102016221797.6 filed Nov. 8, 2016, the entire disclosures of which are incorporated by reference herein.

TECHNICAL FIELD

The disclosure relates to a clamping device for assembly, in particular a belt tensioner to pretension the belt of an accessory belt drive of a combustion engine.

BACKGROUND

Generic clamping devices are disclosed in EP 2 154 394 B1 and DE 10 2013 002 993 A1. They each involve a belt tensioner, which is often also depicted as a two-arm or pendulum clamp. Typically, said belt tensioner pretensions the belt of a starter-generator belt drive of a combustion engine. In such belt drives, the belt pulley of the starter generator, which alternately absorbs torque in generator operation and delivers it in starting operation of the combustion engine, effects a corresponding change of pulling side and return strand of the rotating belt. Therefore, the tensioning of the return strand requires a belt tensioner with two tension rollers, which pretension the belt in front of and behind the belt pulley.

Another application of such a belt tensioner is a conventional accessory belt drive, i.e. a belt drive without starting operation of the generator. In this case, the decoupling effect of the belt tensioner, possibly in conjunction with a belt pulley decoupler, equipped with a decoupler spring and/or a freewheel can have a beneficial effect on the dynamics of the belt drive.

In new condition and when servicing is required, the assembly of the belt tensioner in the belt drive, the assembly and disassembly of the belt, and possibly the disassembly of the belt tensioner from the belt drive, are facilitated by means of a double locking mechanism with an internal and an external locking mechanism. The internal locking mechanism locks the first clamping arm relative to the second clamping arm under a strongly pretensioned spring, and the external locking mechanism locks the second clamping arm relative to the belt drive. Depending on the positioning of the belt tensioner in the belt drive, the external locking mechanism is supported on the starter generator in accordance with DE 10 2013 002 993 A1 or on the engine block of the combustion engine in accordance with EP 2 154 394 B1.

The double locking mechanism facilitates the work when fitting a new belt, in particular if the belt tensioner is maximally relaxed as a result of a broken belt and has to be reset to its assembly position, in which the two tension rollers are twisted so far apart that the new belt can be fitted largely unhindered. In this condition, the clamping arms, if not locked, cannot be supported against the (missing) belt in order to return the belt tensioner to the assembly position. Instead, they would only be rotated together in a circle without reciprocally expanding. The double locking mechanism enables the belt tensioner to be tensioned and reset to the assembly position in just a few steps. Only one mechanic is required to do this as follows:

First, the second clamping arm is locked relative to the belt drive, typically opposite the starter generator or opposite the engine block, by setting the second locking part. For this purpose, the belt tensioner may have to be turned in order to bring the external locking mechanism into its aligned locking position.

The first clamping arm is then twisted to the extent that the two tension rollers twist away from each other. This can be done with one hand and with a tool, via which the force of the increasingly tensioning spring can be perfectly applied. If the internal locking mechanism is in its aligned locking position, the mechanic can set the first locking part with his free hand and lock the first clamping arm relative to the second clamping arm. The belt tensioner is now in its double locked assembly position.

On this basis, the present disclosure is based on the objective of providing a general clamping device of the type mentioned above, which has an improved double locking mechanism.

Various solutions are included in the claims that follow. Accordingly, the locking parts are to intermesh, forming a joint with limited motion, wherein the first locking part carries the second locking part at the limit of joint displacement, whereby the locking mechanism of the second clamping part to the base is released. Compared with well-known double locking mechanisms, the flexible connection of the two locking mechanisms results in considerably simplified handling, because the joint is at the limit of motion, at least when the external locking mechanism is released and possibly also when the external locking mechanism is set, so that the second locking mechanism is naturally also moved by the first locking mechanism and the external locking mechanism is released. Consequently, it is not required to apply direct force to the second locking mechanism, at least not when the external locking mechanism is released.

In addition, combining the locking parts to a single locking tool reduces the number of individual components that would have to be returned or disposed of after assembling the clamping device on the base and after the locking mechanisms have been released.

BRIEF DESCRIPTION OF THE DRAWINGS

Further characteristics of the disclosure result from the following description and from the drawings in which embodiments of an inventive clamping device in general and a belt tensioner for an accessory belt drive of a combustion engine in particular are shown. Unless otherwise indicated, identical or functionally identical characteristics or components are provided with identical reference numbers. It is shown.

Figure 6A:
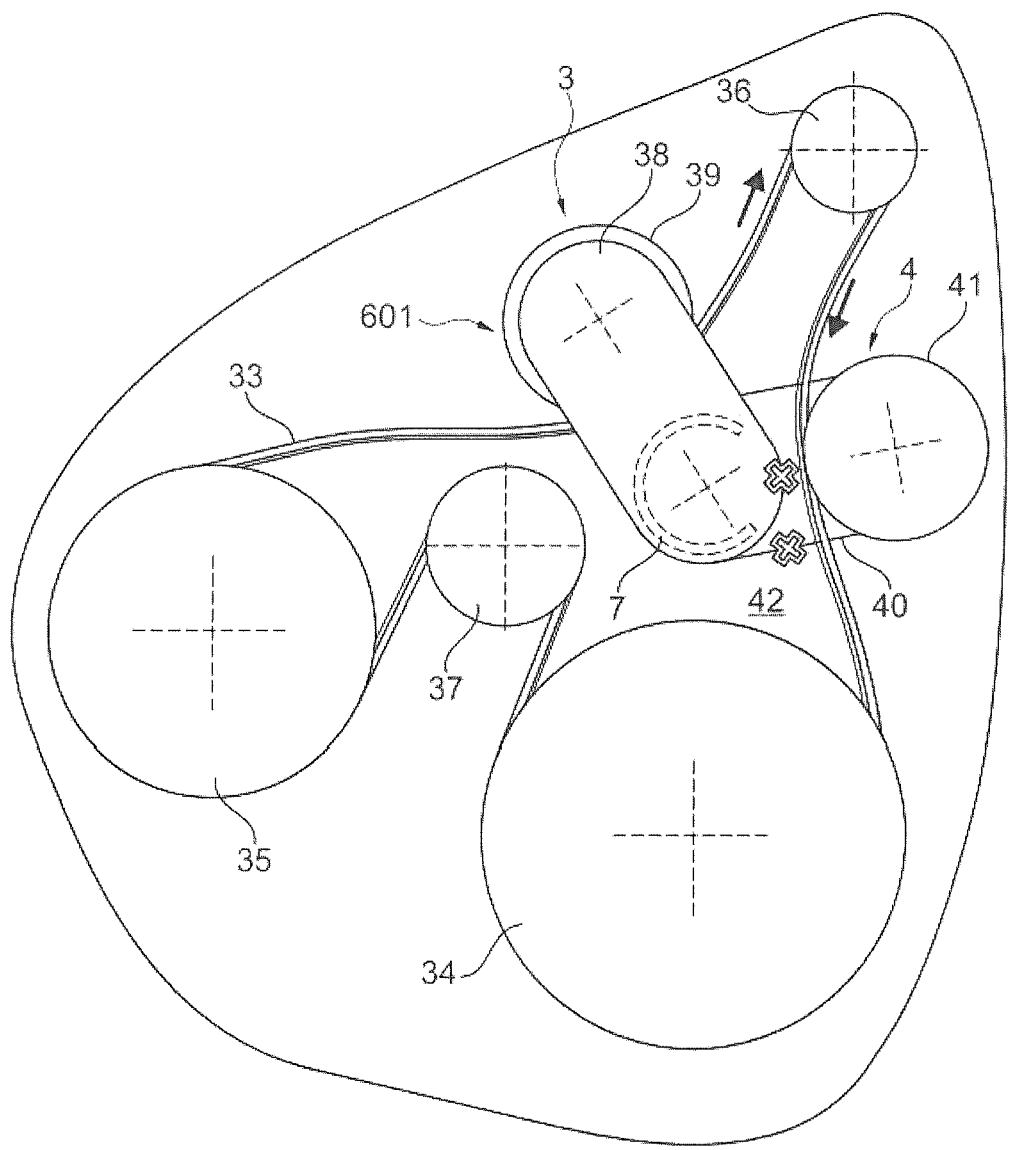
Figure 6B:
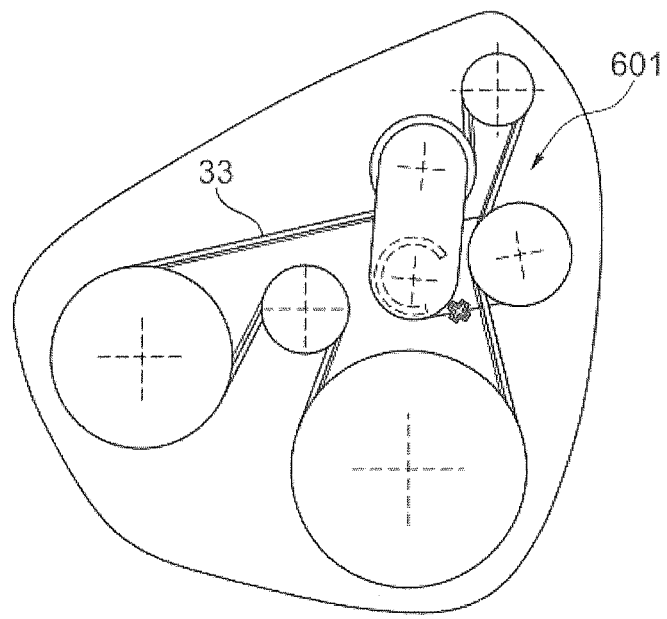
Figure 6C:
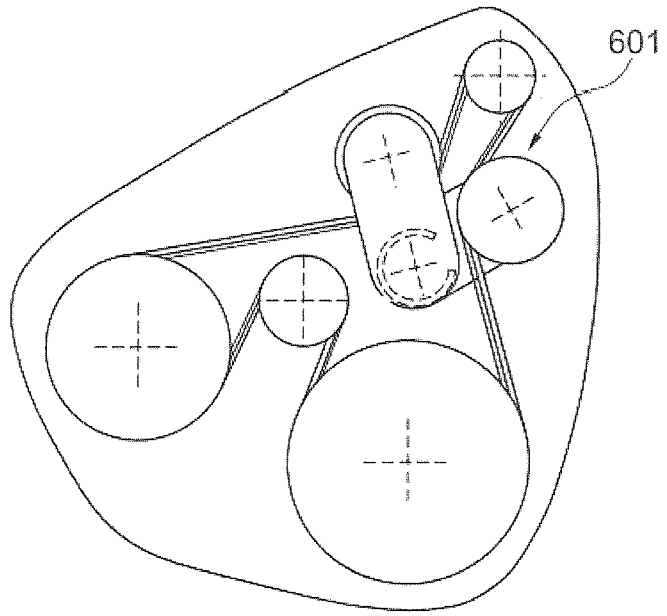
Figure 7:
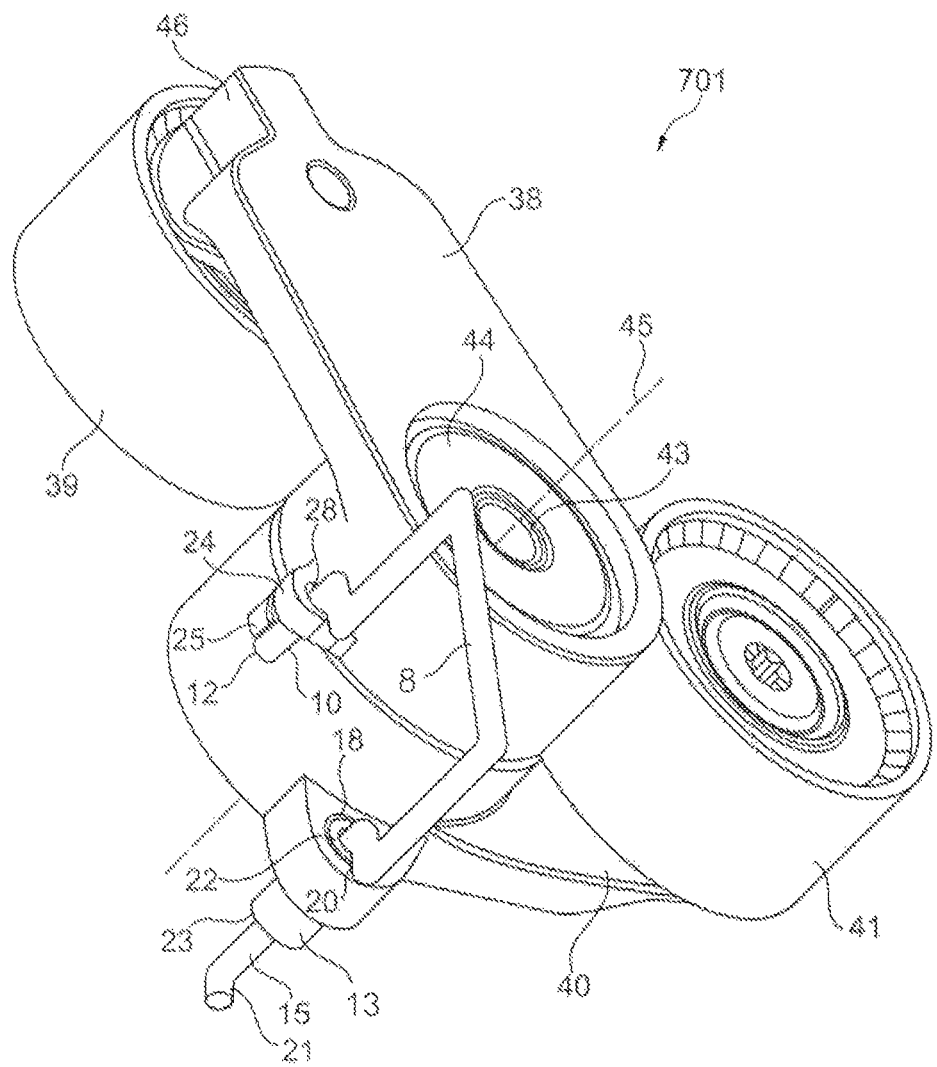
Figure 8:
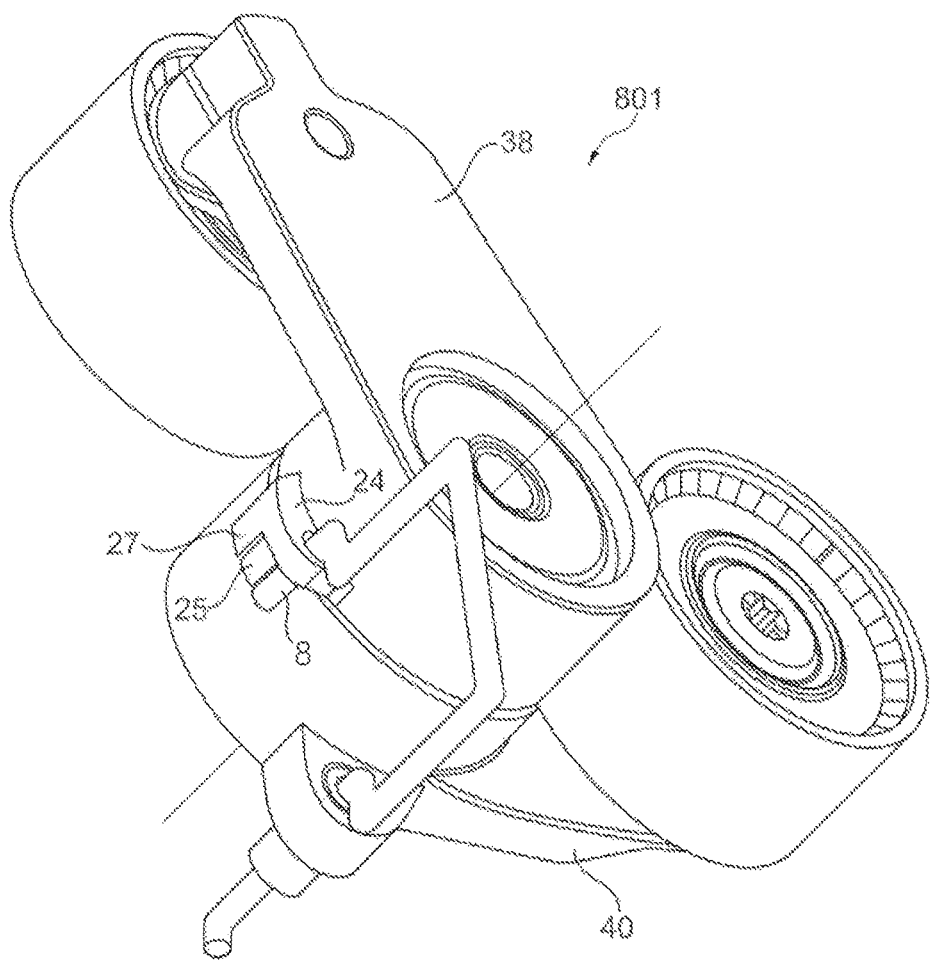

Figures illustrate 6a-c a schematic representation of the assembly sequence of an inventive belt tensioner in the accessory belt drive of a combustion engine;

FIG. 7 illustrates a perspective view of the first embodiment of the belt tensioner according to FIG. 6;

FIG. 8 illustrates a perspective view of the second embodiment of the belt tensioner according to FIG. 6.

DETAILED DESCRIPTION OF THE DRAWINGS

Figure 1A:
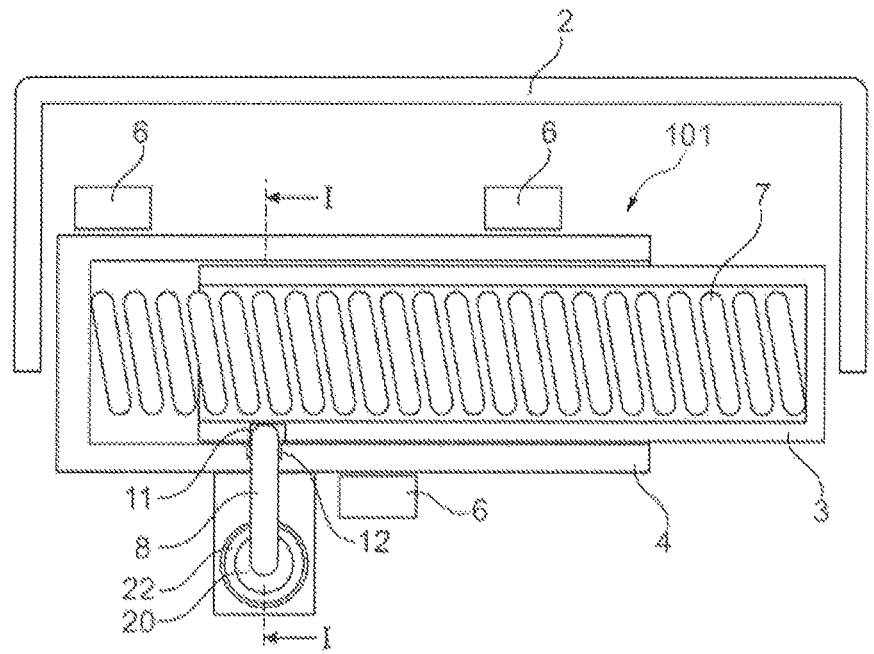
FIGS. 1a-b illustrate a schematic representation of the disclosure based on a longitudinally movable clamping device.
Figure 1B:
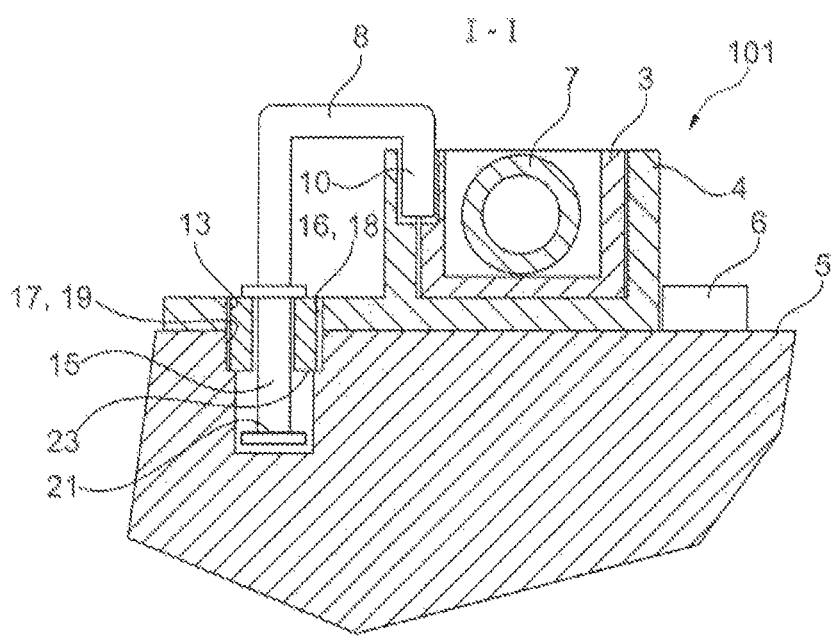

FIGS. 1a and 1b show a top view, or step I-I, of a clamping device 101, which in the (unlocked) operating condition clamps a component 2 enclosing the clamping device 101. The clamping device 101 enclosing a first clamping part 3 and a second clamping part 4, which guides the first clamping part 3 in longitudinal movement and which is assembled on a base 5 to be guided in longitudinally flexible movement. The direction of longitudinal movement relative to the base 5 is predetermined by bearing points 6, which enclose the second clamping part 4 on its longitudinal sides. Force is applied on the two clamping parts 3, 4 by a spring 7, which is fixed between them in their longitudinal direction. In the present case, the spring 7 involves a compression spring the clamping force of which acts on the clamping direction 101 in the form of an extension.

In the position shown in which the spring 7 is strongly tensioned, the two clamping parts 3, 4 are locked together, so that the clamping device 101 is free of force to the outside, i.e. relative to the component 2 to be tensioned during operation. This internal locking mechanism can be released via a first locking part 8, which is configured in the form of a locking pin angled multiple times. Said locking pin is fixed with a first end portion 10 between first clamping surfaces 11 and 12 of the clamping parts 3, 4 and closes the force flow of the spring 7 extending inside over the clamping device 101.

The second clamping part 4 is locked to the base 5 via a second locking part 13, wherein this external locking mechanism can also be released. The second locking part 13 involves a sleeve, which encloses the second end portion 15 of the locking pin 8 and is tensioned between second clamping surfaces 16 and 17 when external force is exerted on the clamping device 101, which clamping surfaces are formed by drill holes 18 and 19 in the second clamping part 4 and in the base 5. The sleeve 13 accommodated in a longitudinally movable manner on the second end portion 15 forms a joint with the locking pin 8 and, in the present case, a rotating and sliding joint, the joint displacement of which in both displacement directions is limited by radial steps 20 and 21 on the locking pin 8, which abut against the respective end faces 22 and 23 of the sleeve 13.

In an alternative embodiment (not shown), the second end portion 15 of the locking pin 8 can also extend completely inside a correspondingly elongated sleeve 13 and strike its inner end.

In the double-locked state of the clamping device 101 shown, the internal locking mechanism is tensioned, and the external locking mechanism is free of force. The clamping device 101 is activated for operation by releasing the two locking mechanisms. First of all, the internal locking mechanism is made free of force by applying an external force to the first clamping part 3, which shortens the clamping device 101 against the spring 7, which continues to clamp. Said external force is supported by the external locking mechanism at the base 5 which is tensioned in the process. When the internal locking mechanism is free of force, the first end portion 10 of the locking pin 8 is removed by pulling it out of the first clamping surfaces 11, 12, so that the internal locking mechanism is released. The external force is then taken away, so that the first clamping part 3 extends under the effect of the clamping force of the spring 7 and the two clamping parts 3, 4 tension the component 2. In this condition the external locking mechanism is again free of force.

The release of the internal locking mechanism, e.g., an only partial extension of the locking pin 8, is performed essentially without force, because the force flow of the external locking mechanism, which is tensioned in the process, passes through the sleeve 13 and not through the second end portion 15 of the locking pin 8, which can be moved therein in longitudinal manner. Nevertheless, the extension of the locking pin 8—without the use of force can be performed only partially, e.g., up to the limit of motion of the sliding joint, which is determined by the lower end face 23 of the sleeve 13 tensioned against the second clamping surfaces 16, 17 and the abutting lower stage 21 of the locking pin 8.

The external locking mechanism is then released by completely extending the locking pin 8 in the second step. In the process, the sliding joint is at a first limit of motion, and the lower stage 21 of the locking pin 8 also moves the sleeve 13, which rests with its lower end 23 against the lower stage of the locking pin. Subsequently, the clamping device 101 is in the unlocked operating condition. This principle, according to which at the limit of motion of the joint the first clamping part 8 inevitably moves the second clamping part 13 along with it, so that the external locking mechanism is released, applies to all embodiments of the disclosure subsequently described.

The process of locking the clamping device 101, starting with an unlocked operating condition, into the double-locked state shown is performed conversely in the following steps:

Lengthwise adjustment of the clamping device 101 for the purpose of aligning the drill holes 18, 19 with each other.

Setting the external locking mechanism. The upper stage 20 of the locking pin 8 not only forms a loss-proof connection between the sleeve 13 and the locking pin 8 but also supports the insertion of the sleeve 13 into the two drill holes 18, 19, as a second limit of motion of the sliding joint.

External application of force to the first clamping part 3 against the tensioning clamping spring 7 in order to position the first clamping surfaces 11, 12.

Setting the inner locking mechanism by inserting the first end portion 10 of the locking pin 8 between the first clamping surfaces 11, 12.

Removal of the external force.

Figure 2A:
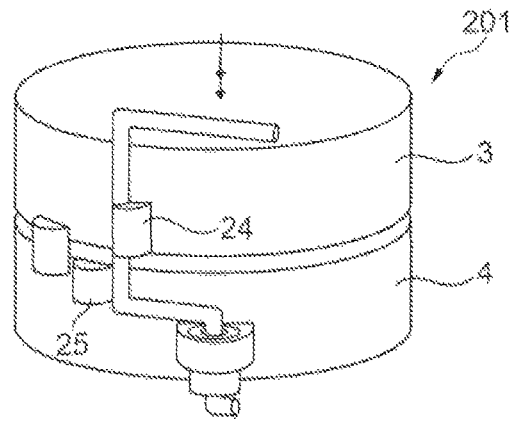
FIGS. 2a-e illustrate a schematic representation of the disclosure based on a first rotationally movable clamping device.

The clamping device 201 shown in FIGS. 2a to 2e in simplified form comprises the two clamping parts 3 and 4, which can be rotated relative to each other and relative to the base (not shown), and the spring (not visible), which is arranged in the interior of the clamping device 201 and which applies torque to the first clamping part 3 relative to the second clamping part 4 in the arrow direction shown in FIG. 2a. The sleeve 13, which is accommodated to be moved on the second end portion 15 of the locking pin 8, strikes with its two end faces 22, 23 against the steps 20 and 21, which are configured here in the form of radial angulations of the (multiply angled) locking pin 8.

In contrast to the previously described embodiment, in this case the steps 20, 21 are so slightly spaced that the sleeve 13 and the locking pin 8 can hardly be displaced from each other, but essentially intermesh only in a swivel joint. As a result, the limits of motion of the joint are predetermined only in displacement direction and by the small axial play of the sleeve 13 on the second end portion 15 of the locking pin 8. The configuration of the joint virtually in the form of a swivel joint has the advantage that the end portion 15 of the locking pin 8 axially projecting from the base opposite the sleeve 13 and thus a drill hole 19 in the base 5 corresponding to FIG. 1b can have a very short configuration. As already mentioned above in the context of the clamping device 101, the end portion 15 can also extend completely inside the sleeve 13 and strike inside the sleeve 13.

As unembodied alternatives to the angulations, the steps 20 and/or 21 of the locking pin 8 can also be configured as deformations having a non-circular cross-section, the enveloping circle of which is greater than the inner diameter of the sleeve 13.

The internal locking mechanism is formed by the locking pin 8 and the two first clamping surfaces 11 and 12 extending at projections 24 and 25 of the clamping parts 3, 4, between which the locking pin 8 is fixed with its central section 26, thus closing the force flow of the spring 7 extending over the clamping device 201. The external locking mechanism, in turn, is formed by the second clamping surface 16 in the drill hole 18 in the second clamping part 4, a drill hole 19 corresponding to FIGS. 1a and 1b, having the second clamping surface 17 of the base 5 and the sleeve 13 fixed between them.

FIGS. 2a to 2e show the release of the two locking mechanisms as a sequence.

FIG. 2a/initial state: the clamping device 201 is in a double-locked state.

Figure 2B:
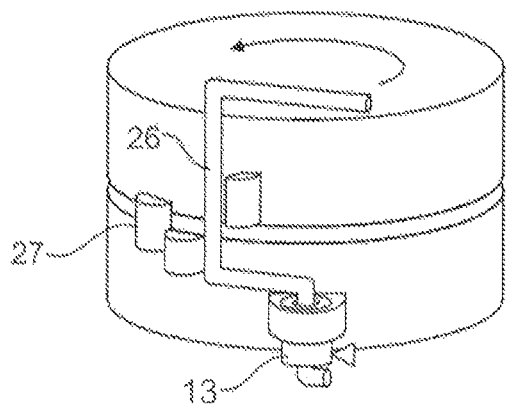

FIG. 2b/relaxing the internal locking mechanism: the first clamping part 3 is supplied with an external torque in counter direction to the torque of the spring, and the first clamping part 3 is rotated in the direction indicated by the arrow until the first clamping surfaces 11, 12 and thus the internal locking mechanism are free of force. The external torque is supported by the external locking mechanism, as symbolized by the arrow on the sleeve 13. The torsion angle of the first clamping part 3 is limited by a further projection 27 on the first clamping part 3, which strikes the projection 25 of the second clamping part 4 when as shown the internal locking mechanism is free of force. This limit stop prevents an overload of the spring, which continues to tension when the internal locking mechanism is released, and which is configured in such a way that the two projections 27 and 25 strike against each other when the internal locking mechanism is free of force.

Figure 2C:
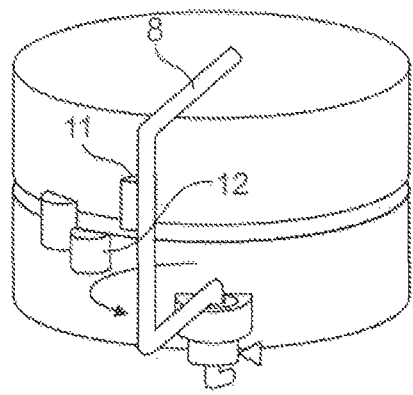

FIG. 2c/releasing the internal locking mechanism: in the first step, the locking pin 8 is rotated in the depicted arrow direction in the joint opposite the projection 24 when the internal locking mechanism is free of force and the external locking mechanism is tensioned to the extent that the first clamping part 3 can be freely rotated opposite the central section 26 of the locking pin 8.

Figure 2D:
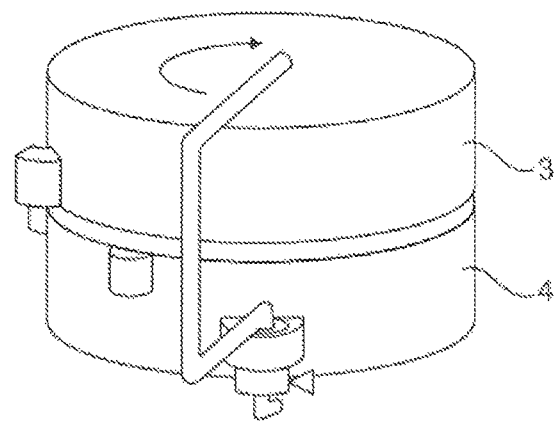

FIG. 2d/relaxing the external locking mechanism: the external torque is removed so that the first clamping part 3 rotates in the depicted arrow direction under the effect of the spring torque and clamps together with the second clamping part 4 a component (not shown here). In this state of balance, the external locking mechanism is free of force.

Figure 2E:
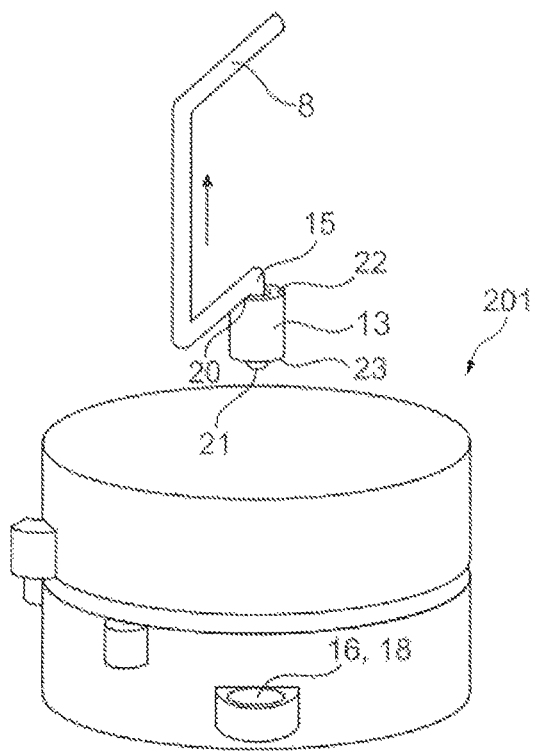

FIG. 2e/releasing the external locking mechanism: in a second step, the locking pin 8 is completely removed together with the sleeve 13, which is connected to it in a flexible and secure manner, by pulling said locking pin out of the base and the drill hole 18. The clamping device 201 is now in locked operating condition.

The clamping devices 301, 401 and 501 shown in FIGS. 3 to 5 differ with respect to the locking mechanisms described above for the clamping device 201, wherein subsequently only the essential distinguishing characteristics are provided.

Figure 3:
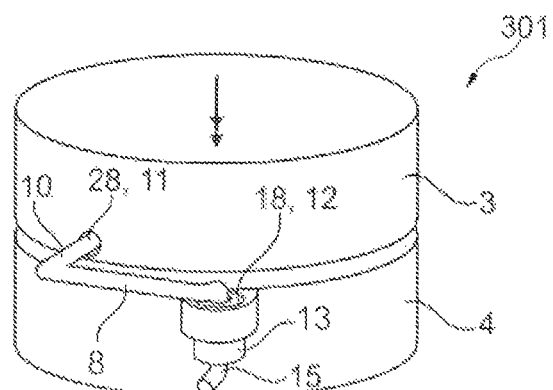
FIG. 3 illustrates the schematic representation of the disclosure according to FIG. 2 having a second rotationally movable clamping device.

FIG. 3: compared with the embodiment shown in FIG. 2 the internal locking mechanism is formed, on the one hand, by a radial drill hole 28 in the first clamping part 3 and the first end portion 10 of the locking pin 8 inserted therein and, on the other hand, by its second end portion 15 with the sleeve 13 that can be rotated thereon in the drill hole 18 of the second clamping part 4. As a result, the first clamping surfaces 11 and 12 extend in the drill holes 28 or 18.

Figure 4:
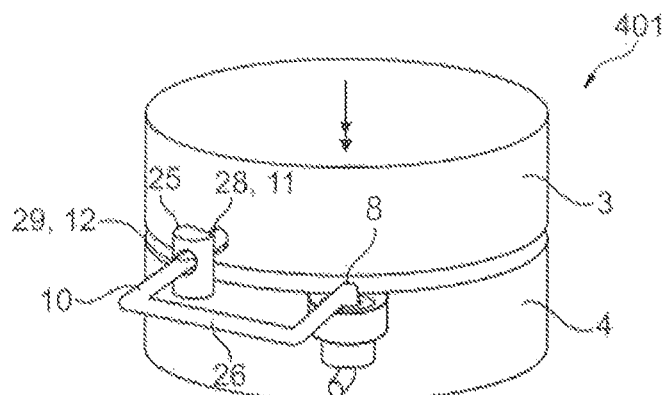
FIG. 4 illustrates the schematic representation of the disclosure according to FIG. 2 having a third rotationally movable clamping device.

FIG. 4: compared with the embodiment shown in FIG. 3, the internal locking mechanism is formed by the radial drill hole 28 in the first clamping part 3, a radial drill hole 29 is formed by the projection 25 on the second clamping part 4 and the first end portion 10 of the locking pin 8, which is inserted into the drill holes 28, 29. Because of the fact that the drill holes 28 and 29 form the first clamping surfaces 11 or 12, the central section 26 of the locking pin 8 is free of force.

Figure 5:
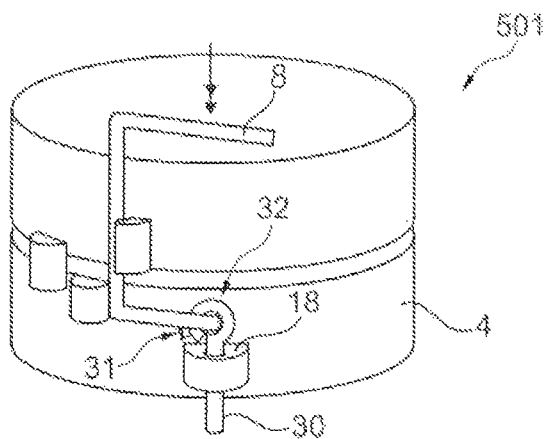
FIG. 5 illustrates the schematic representation of the disclosure according to FIG. 2 having a fourth rotationally movable clamping device.

FIG. 5: compared with the embodiment according to FIG. 2, the external locking mechanism is formed by a further locking pin 30, which pushes through the drill hole 18 on the second clamping part 4. As in the embodiments according to FIGS. 2 to 4, the joint involves a swivel joint without significant longitudinal mobility, in which case the joint torsion is made possible by orthogonally intermeshing eyelets 31 and 32 of the locking pins 8 or 30. The minor joint displacement is limited by the reciprocal play of the eyelets 31, 32.

FIGS. 6a to 6c show an embodiment of the clamping device, namely as belt tensioner 601 for pretensioning the belt 33 of an accessory belt drive of a combustion engine. The belt 33 wraps around the respective belt pulley 34, 35 and 36 of the crankshaft, the water pump and the generator, as well as a guide roller 37. The first clamping part 3 of the belt tensioner 601 is a first clamping arm 38 with a first tension roller 39, and the second clamping part 4 is a second clamping arm 40 with a second tension roller 41. The clamping arms 38, 40 are assembled to be pivoted reciprocally and relative to the engine block 42. The tension rollers 39, 41 are arranged in the direction of rotation of the belt 33 (as indicated by the arrows in FIG. 6a), directly in front of or directly behind the belt pulley 36 of the generator. The generator is a starter generator, which can also be operated as an engine, wherein the clamping arms 38, 40 are swiveled when the operating conditions of the generator change and the tension rollers 39, 41 alternately apply pretension force to the operationally instantaneous return strand of the belt 33. Said pretension force is generated by the spring 7, which is fixed inside the belt tensioner 601 between the clamping arms 38, 40 in such a way that the spring force rotates the clamping arms 38, 40 with the tension rollers 39, 41 towards the generator and towards each other.

The mode of operation of the belt tensioner 601, i.e. the tensioning swivel of the respective clamping arm 38 and 40 into the current return strand of the belt 33 also results in a so-called decoupling of the rotating generator mass from the crankshaft of the combustion engine. This decoupling is usually performed by a decoupler on the generator (for example, a generator freewheel with or without spring decoupling) or on the crankshaft, which in conventional generator machines without starter operation is arranged on the generator shaft or on the crankshaft and decouples the comparatively inert rotating generator mass from the crankshaft if its speed gradient is negative. Accordingly, the inventive belt tensioner 601 can also be used with conventional generator belt drives (without starter operation) as an alternative or as a support for the decoupler.

In FIG. 6a the belt tensioner 601 is in double locked condition, so that the belt 33 is without pretension. The two locking mechanisms are symbolized by the depicted crosses, the outer locking mechanism locking the second clamping arm 40 with the engine block 42—corresponding to the base 5 in FIG. 1b—. In alternative embodiments, the belt tensioner 601 can generally be assembled on a part attached to the engine block 42 and—in a modified form—on a generator with or without starting function.

FIG. 6b shows the belt tensioner 601 with released internal and not yet released external locking mechanism, wherein the belt 33 is already pretensioned.

FIG. 6c shows the belt tensioner 601 with released internal and external locking mechanism, wherein the belt tensioner 601 is twisted into a position, which is located approximately centrally between its two operating positions in generator operation and in engine operation of the generator.

FIG. 7 shows an embodiment of the belt tensioner 601 depicted schematically in FIGS. 6a to 6c. The two clamping arms 38, 40 of the belt tensioner 701 are each assembled to be rotated on a tensioner casing, which is composed of a hollow bolt 43 and two stop discs attached at its end, of which only the upper stop disc 44, remote from the engine block, is visible. The tensioner casing is fastened to the engine block 42 (see FIG. 6a) via a screw (not shown), which pushes through the hollow bolt 43. The spring (spring 7 in FIG. 6a) twisting the two tension rollers 39 and 41 on top of each other is a torsion spring, which is fixed between the clamping arms 38, 40 and which—not visible in the figure—is arranged concentrically to the hollow bolt 43 in a cylindrical annular space in the interior of the clamping arms 38, 40.

The belt tensioner 701 is in its position of assembly, in which the internal locking mechanism holds the two clamping arms 38, 40 reciprocally expanded, and the two tension rollers 39, 41 are twisted so far apart that, in the case of the assembled belt drive shown in FIG. 6a, the belt 33 is free of pretension or otherwise only slightly pretensioned. As a result, when assembling the belt drive, the belt 33 can be applied without force or with only little force.

The internal locking mechanism comprises as first locking part 8 the multiangled locking pin 8. the first end portion 10 of said locking pin 8 pushes the drill hole 28 extending parallel to the axis of rotation 45 of the belt tensioner 701 through the projection 24 on the first clamping arm 38. It also supports the torque of the strongly tensioned spring on the first clamping surface 12 formed by the projection 25 on the second clamping arm 40. The second locking part 13, which is configured in the form of a sleeve 13, pushes through the drill hole 18, which also extends parallel to the axis of rotation 45, in the second clamping arm 40, wherein the second end portion 15 of the locking pin 8 pushing through the sleeve 13 forms the combined rotating and sliding joint, the joint displacement of which is limited by the steps 20 and 21 striking against the end faces 22, 23 of the sleeve 13 and are formed by the angulation of the locking pin 8.

When the assembly of the belt drive is not automated, only a mechanic is required, who can also release the two locking devices by himself. Basically, this is performed in the manner described above in the context of FIGS. 1 and 2, wherein the mechanic applies the torque required for releasing the internal locking mechanism with one hand, holds and removes it and pulls in the first step the locking pin 8 with the sleeve 13 with the other hand and in the second step completely removes it together with the sleeve 13. The twisting and holding of the clamping arms 38, 40 can be performed with standard tools. In the present case, the roller ends of the clamping arms 38, 40 are each provided with a dihedron 46 for an open-end wrench. During service operations, the belt tensioner 701 is reset in its position of assembly in reverse order. First the external locking mechanism and then the internal locking mechanism are set.

FIG. 8 shows a belt tensioner 801, which is modified in comparison to FIG. 7, the clamping arms 38, 40 of which strike against each other as in the clamping devices 201 and 501 in a position in which the spring for releasing the internal locking mechanism is more highly tensioned than in the position of assembly. The further projection 27, which is constructively formed by circumferentially extending the projection 24 on the first clamping arm 38, is slightly spaced from the projection 25 on the second clamping arm 40 located on the opposite side of the locking pin 8. To prevent the spring from overloading as a result of overtwisting when the internal locking mechanism is released, this distance is dimensioned in such a way that the two projections 27 and 25 strike against each other especially when the locking mechanism is free of force.

LIST OF REFERENCE NUMERALS

101 clamping device
201 clamping device
301 clamping device
401 clamping device
501 clamping device
601 belt tensioner
701 belt tensioner
801 belt tensioner
2 component
3 first clamping part/first clamping arm
4 second clamping part/second clamping arm
5 base
6 bearing point
7 spring
8 first locking part/locking pin
10 first end portion of the locking pin
11 first clamping surface of the first clamping part
12 first clamping surface of the second clamping part
13 second locking part/sleeve
15 second end portion of the locking pin
16 second clamping surface of the second clamping part
17 second clamping surface of the base
18 drill hole in the second clamping part
19 drill hole in the base
20 upper radial stage of the locking pin
21 lower radial stage of the locking pin
22 upper end face of the sleeve
23 lower end face of the sleeve
24 projection on the first clamping part
25 projection on the second clamping part
26 central section of the locking pin
27 further projection on the first clamping part
28 drill hole in the first clamping part
29 drill hole in the second clamping part
30 further locking pin
31 eyelet on the first locking pin
32 eyelet on the second locking pin
33 belt 34 belt pulley of the crankshaft
35 belt pulley of the water pump
36 belt pulley of the generator
37 guide roller
38 first clamping arm
39 first tension roller
40 second clamping arm
41 second tension roller
42 engine block
43 hollow bolt
44 stop disc
45 axis of rotation
46 surface

The invention claimed is:

1. A clamping device for assembly on a base, comprising:
a first clamping part and a second clamping part, which are movable reciprocally and relative to the base;
a spring fixed between the first and second clamping parts wherein the spring applies force to the first and second clamping parts in a direction of the reciprocal movement thereof;
a first locking part, which detachably locks the first and second clamping parts to each other when the spring tensioned; and
a second locking part for detachably locking the second clamping part to the base;
wherein the locking parts intermesh by forming a joint with limited motion, wherein the first locking part moves along with the second locking part at the limit of motion of the joint and a locking mechanism of the second clamping part to the base is released.

2. A clamping device according to claim 1, wherein the joint involves a rotating and sliding joint with limited joint displacement, wherein the first locking part moves along with the second locking part at the limit of the limited joint displacement.

3. A clamping device according to claim 2, wherein the locking parts strike against each other to limit the joint displacement.

4. A clamping device according to claim 3, wherein the joint displacement is limited in both displacement directions.

5. A clamping device according to claim 1, wherein the joint torsion is made possible by intermeshing eyelets of the locking parts.

6. A clamping device according to claim 1, wherein the first locking part includes a locking pin, and that the second locking part includes a sleeve, which encloses the locking pin.

7. A clamping device according to claim 6, wherein the joint displacement is limited by angulations or steps of the locking pin against which the sleeve strikes with both end faces.

8. A clamping device according to claim 1, wherein the first clamping part is detachable from the second clamping part by rotating the first locking part in the joint.

9. A clamping device according to claim 1, wherein the clamping device includes a belt tensioner to pretension a belt of an accessory belt drive of a combustion engine forming the base, wherein:
the first clamping part involves a first clamping arm having a first tension roller,
the second clamping part involves a first clamping arm having a second tension roller,
the spring fixed between the clamping arms rotating the tension rollers toward each other to produce belt pretension,
the first locking part locks the clamping arms in a position of assembly of the belt tensioner, in which the tension rollers are twisted away from each other to reduce or eliminate the belt pretension, and
and the second locking part locks the second clamping arm with a part of the engine.

10. A clamping device according to claim 9, wherein the clamping arms strike against each other in a position in which the spring is more highly tensioned than in the position of assembly of the belt tensioner.

11. A clamping device comprising:
a first clamping part and a second clamping part, which are movable relative to one another;
a spring fixed between the first and second clamping parts, wherein the spring applies a force to the first and second clamping parts in a direction of the relative movement between the first and second clamping parts;
a first locking part, which detachably locks the first and second clamping parts to each other when the spring is tensioned; and
a second locking part for detachably locking the second clamping part to a base;
wherein the first and second locking parts intermesh via a moveable joint with a limited motion.

12. The clamping device of claim 11, wherein the first locking part moves along with the second locking part at the limit of motion of the joint.

13. The clamping device of claim 12, wherein the second clamping part includes a locking mechanism configured to lock the second clamping part to the base, and the locking mechanism is released when the first locking part carries the second locking part at the limit of motion of the joint.

14. The clamping device of claim 11, wherein the first and second locking parts contact each other to limit the motion of the joint.

15. The clamping device of claim 14, wherein the joint displacement is limited in two displacement directions.

16. The clamping device of claim 11, wherein the first locking part is a pin and the second locking part is a sleeve that at least partially encloses the pin.

* * * * *